United States Patent [19]
Otani

[11] Patent Number: 5,398,132
[45] Date of Patent: Mar. 14, 1995

[54] OPTICAL APPARATUS HAVING IMAGE STABILIZING DEVICE

[75] Inventor: Tadasu Otani, Yokohama, Japan

[73] Assignee: Canon Kabushiki Kaisha, Tokyo, Japan

[21] Appl. No.: 213,826

[22] Filed: Mar. 14, 1994

Related U.S. Application Data

[63] Continuation of Ser. No. 957,823, Oct. 8, 1992, abandoned.

[30] Foreign Application Priority Data

Oct. 9, 1991 [JP] Japan .................................. 3-289373

[51] Int. Cl.[6] .............................................. G02B 27/64
[52] U.S. Cl. .................................................... 359/557
[58] Field of Search ................................ 359/554, 557

[56] References Cited

U.S. PATENT DOCUMENTS 4,235,506 11/1980 Saito et al. ............................ 350/16
5,122,908 6/1992 Sporer .................................. 359/554

FOREIGN PATENT DOCUMENTS 61-296862 12/1986 Japan .
0214114 9/1991 Japan .................................... 359/557
0237438 10/1991 Japan .................................... 359/554

Primary Examiner—Edward K. Look
Assistant Examiner—Mark Sgantzos
Attorney, Agent, or Firm—Fitzpatrick, Cella, Harper & Scinto

[57] ABSTRACT

A correction optical member can be locked and unlocked without wasting electric power or requiring cumbersome operations. A locking control member (16) for operating a locking member (20) in synchronism with movement of a lens barrel for holding an optical system including a correction optical member (17a) between a collapsed state and a photographing preparation state is arranged. The locking member is operated in synchronism with a projecting operation of the lens barrel from the collapsed state to the photographing preparation state and a retracting operation of the lens barrel from the photographing preparation state to the collapsed state, so that the correction optical member is set in a swingable state or is locked at a predetermined position.

50 Claims, 10 Drawing Sheets

OPTICAL APPARATUS HAVING IMAGE STABILIZING DEVICE

This application is a continuation of prior application Ser. No. 07/957,823, filed on Oct. 8, 1992, now abandoned.

BACKGROUND OF THE INVENTION

1. Field of the Invention

The present invention relates to an optical apparatus having an image stabilizing device for performing vibration suppression by deflecting a light beam.

2. Related Background Art

A conventional camera having a vibration suppression function will be described below.

In recent cameras, since all the operations necessary for a photographing operation such as exposure determination, focusing, and the like are automatically performed, even a person who is not skilled in camera operations rarely makes an unsuccessful photographing operation. However, it is difficult to automatically prevent an unsuccessful photographing operation caused by a camera vibration.

Thus, in recent years, extensive studies have been made to achieve cameras, which can prevent an unsuccessful photographing operation caused by a camera vibration. In particular, cameras, which can prevent an unsuccessful photographing operation caused by a hand vibration of a photographer, have been developed and studied.

For example, a hand vibration of a camera in a photographing operation will be explained below. The hand vibration normally has a frequency of 1 Hz to 20 Hz. As a basic principle for allowing to confirm a state free from an image blur when an object is viewed through a finder of a camera even when a camera vibration occurs, and to take a photograph free from an image blur upon a shutter release operation of the camera, the camera vibration must be detected, and a correction lens must be displaced according to the detection value.

In order to achieve this object, i.e., to allow to take a photograph without causing an image blur even in the camera vibration state, the camera vibration can be detected by arranging, in a camera, a vibration sensor for detecting an angular acceleration, an angular speed, or the like, and a camera vibration detection system for electrically or mechanically integrating the sensor signal to output an angular displacement in a camera in principle. Based on this detection information, a correction optical system having a correction lens whose photographing optical axis is decentered or inclined as an optical correction member is driven, thereby performing image blur correction.

An image blur correction camera system using an angular accelerometer will be described below with reference to FIG. 10.

This system corrects an image blur caused by a camera vertical vibration 51p and a camera horizontal vibration 51y in directions of arrows 51 in FIG. 10. The system includes a lens barrel 52, angular accelerometers 53p and 53y, respectively having angular acceleration detection directions 54p and 54y, for respectively detecting angular accelerations of the camera vertical and horizontal vibrations, and integrators 55p and 55y, comprising known analog integration circuits, each for integrating and converting an angular acceleration signal into an angular displacement. A correction optical system 56 (including drivers 57p and 57y, and correction optical position sensors 58p and 58y) is driven in directions 51p and 51y in a plane perpendicular to the optical axis according to the signals output from the integrators 55p and 55y so as to decenter the photographing optical axis and to assure a stable image plane 59, thus obtaining the image blur correction effect.

In the above-mentioned case, the image blur correction is performed. However, when no image blur correction is performed, the correction optical system 56 must be electrically or mechanically fixed. When the camera is carried, if the correction optical system 56 is not fixed, there is no force for restricting the movement of the correction optical system 56 in the plane perpendicular to the optical axis. As a result, the correction optical system 56 unexpectedly swings due to a vibration by carrying, thus generating noise upon collision with other surrounding members, and damaging the correction optical system 56 and its function by collision.

Conventionally, when image blur correction is not performed for a long period of time, the correction optical system 56 is fixed not by an electrical fixing member, i.e., by driving the mechanism 56 by inputting a predetermined signal to it, but by a mechanical fixing member in terms of energy saving. When the image blur correction effect is to be obtained, the mechanical fixing member must be released.

From this viewpoint, U.S. Pat. No. 4,235,506 made a proposal for mechanically fixing and releasing a correction optical system, which swings in a telescope or a binocular, and Japanese Laid-Open Patent Application No. 61-296862 made a proposal for mechanically fixing and releasing a correction optical system, which pivots in a video camera.

However, in these prior arts, the correction optical system is fixed and released by operating an exclusive external operation member. This forces a photographer to perform cumbersome operations to fix and release the correction optical system in addition to a photographing operation.

Furthermore, when a photographer forgets to fix the correction optical system, since the correction optical system maintains an image blur correction state or electrically holds a predetermined position, electrical power is consumed, thus wasting a battery. On the other hand, when the electrical holding state is not set, the function of the correction optical system is damaged by a shock due to an unexpected vibration by, e.g., carrying of a camera.

SUMMARY OF THE INVENTION

One aspect of the invention is to provide an optical apparatus having a vibration suppression device, comprising a vibration suppression member for performing vibration suppression by deflecting a light beam upon movement in an optical path, a support member for movably supporting the vibration suppression member, a movable lens member, and a lock member for switching between a first state wherein the vibration suppression member is movable with respect to the support member, and a second state wherein the vibration suppression member is fixed to the support member. The locking member switches a lock state according to movement of the lens member between a non-photographing state and a photographing preparation state. Thus, a vibration suppression device, which can lock and unlock a correction optical member without wasting electric power or requiring cumbersome operations, can be provided.

DETAILED DESCRIPTION OF THE PREFERRED EMBODIMENTS

Figure 1:
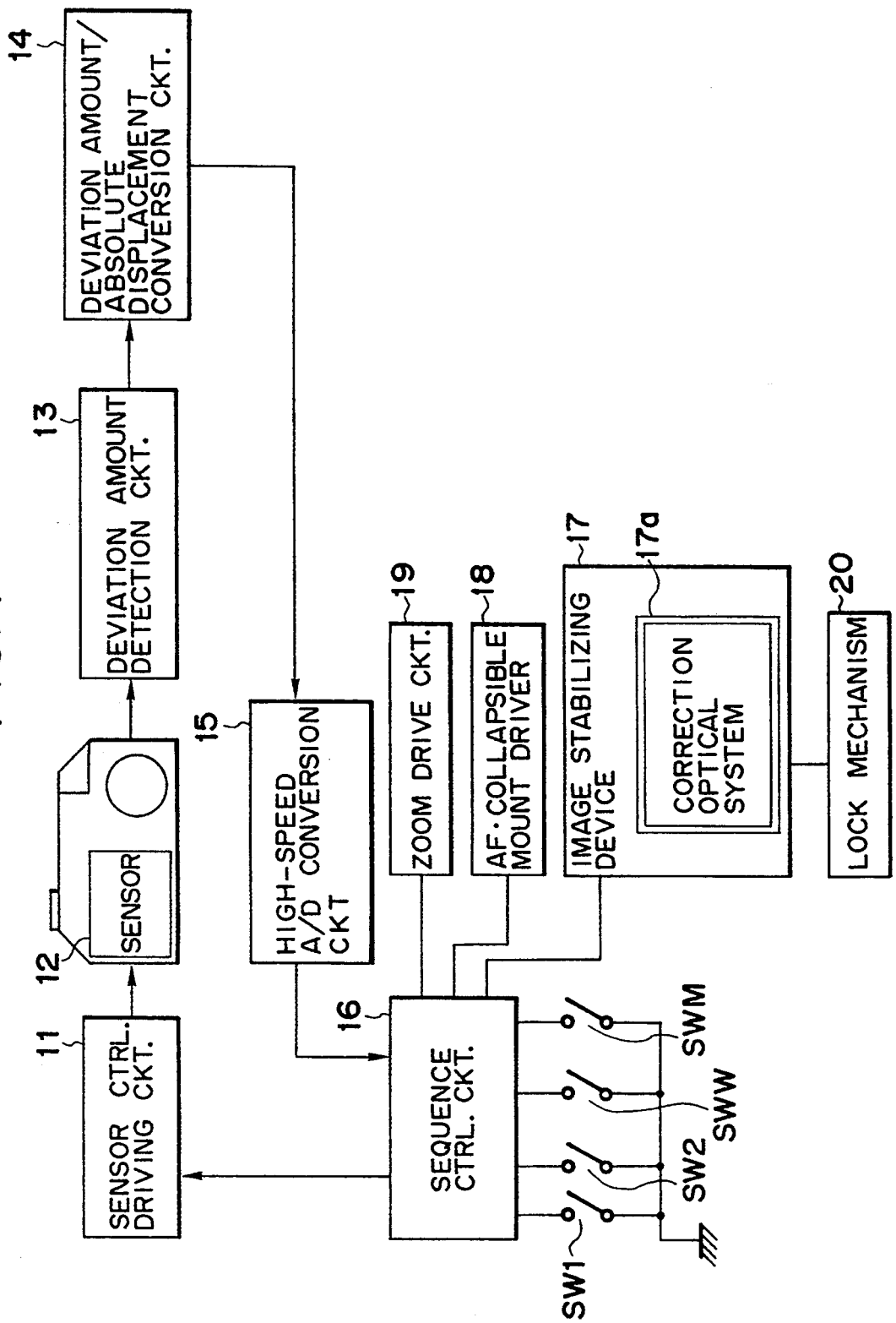
FIG. 1 is a schematic block diagram showing an arrangement of a camera according to each embodiment of the present invention.

FIG. 1 is a block diagram showing a camera according to the first embodiment of the present invention. Note that a camera according to the present invention is one integrated with a camera body and a lens, and having collapsible mount, zooming, and auto-focus functions.

In FIG. 1, the camera comprises a sensor control driving circuit 11 for controlling and driving a sensor (to be described later) for detecting a camera vibration and outputting camera vibration information, a sensor 12, a deviation amount detection circuit 13 for detecting a hand vibration or deviation amount (i.e., an image blur amount on a film surface) from the output from the sensor 12, a deviation amount/absolute displacement conversion circuit 14 for converting the deviation amount into an absolute displacement, a high-speed A/D conversion circuit 15 for converting the converted analog absolute displacement (of the deviation amount) into a digital value, a sequence control circuit 16 for controlling a lens barrel operation, a photographing operation, and an image blur correction operation of the camera, an image stabilizing device 17 including a correction optical system 17a for performing an image blur correction operation according to the vibration amount of the camera, an AF•collapsible mount driver 18 for driving the lens barrel so as to perform AF and retracting operations of the camera, a zoom drive circuit 19 for driving the lens barrel so as to perform the zooming operation of the camera, a lock mechanism 20 for locking or unlocking the correction optical system 17a, a switch SW1 which is turned on by the first stroke of a release button, a switch SW2 which is turned on by the second stroke of the release button, a wide-end switch SWW which is turned on when the lens barrel projects to the wide end, and a main switch SWM of the camera.

The operation of the above arrangement will be described below.

The sequence control circuit 16 is started by the main switch arranged on an outer portion of the camera, and operated by a photographer. Thereafter, the sequence control circuit 16 supplies a power supply voltage to the AF•collapsible mount driver 18, and causes the lens barrel to project from the camera main body. When the wide-end switch SWW indicating a predetermined photographable state (the wide end in this embodiment) is turned on, the sequence control circuit 16 stops supply of the power supply voltage to the AF•collapsible mount driver 18, and stands by in a photographable state.

In synchronism with the above-mentioned lens barrel projecting operation from the collapsed position to the photographable wide-end position, the lock mechanism 20 unlocks the correction optical system 17a.

At almost the same time with this operation, the sequence control circuit 16 supplies a command signal to the correction optical system 17a so as to electrically hold the optical axis of a correction lens to coincide with the optical axis of a photographing optical system.

When the switch SW1 is turned on upon depression of the release button (not shown) to the first stroke position, the sequence control circuit 16 transmits a signal to the sensor control driving circuit 11 to supply a power supply voltage to a deviation amount detection system and to drive the sensor 12, thus starting detection of the actual deviation amount of the camera, i.e., a hand vibration amount.

Only the hand vibration amount is detected by the deviation amount detection circuit 13 from the value output from the sensor 12. In this case, the output signal has different meanings depending on the type of sensor 12. For example, when the sensor 12 comprises an angular acceleration sensor, an angular acceleration output excited upon a hand vibration is detected and output; when it comprises a sensor such as a vibration gyro, an angular speed output of a hand vibration is detected and output; or when it comprises a sensor for suspending a pendulum in the direction of gravity, and 10 detecting a hand vibration according to the swing angle of the pendulum, an angular output of the hand vibration is detected and output. In order to convert this detection output into a displacement of the hand vibration by the deviation amount/absolute displacement conversion circuit 14, the signal output from the deviation amount detection circuit 13 is integrated once or twice, and is then converted into an absolute displacement in this circuit. Furthermore, the absolute displacement is converted into a digital value by the high-speed A/D conversion circuit 15, and the digital value is fetched by the sequence control circuit 16 as the hand vibration amount.

The sequence control circuit 16 outputs a command signal in a direction to correct a photographing lens with respect to the hand vibration in the image stabilizing device 17 on the basis of the fetched data, thus stabilizing an image on the image plane.

The image stabilizing device 17 performs a closed-loop servo driving operation so that the correction lens of the correction optical system 17a follows the command signal.

The image stabilizing device 17, the correction optical system 17a, and the lock mechanism 20 will be described below with reference to FIG. 2.

In the correction optical system 17a, a correction lens 21 is desirably driven in two orthogonal directions (a pitch direction 22p and a yaw direction 22y) perpendicular to the optical axis. The arrangement of the correction lens 21 will be described below.

A fixing frame 23 for holding the correction lens 21 is slidable along a pitch slide shaft 25p through sliding bearings 24p, and the pitch slide shaft 25p is attached to a first holding frame 26.

A pitch coil 28p is attached to the fixing frame 23. The pitch coil 28p is placed in a magnetic circuit constituted by a pitch magnet 29p and a pitch yoke 210p, and when a current is flowed, the fixing frame 23 is driven in the pitch direction 22p.

Furthermore, the fixing frame 23 has a slit 211p and a light-emitting element 212p (infrared light-emitting diode), and the position of the fixing frame 23 in the pitch direction 22p is detected in combination with a light-receiving element 213p (semiconductor position detector PSD) arranged on a housing 214.

The housing 214 is integrated with the lens barrel (not shown in FIG. 2), and is arranged in a plane perpendicular to the photographing optical axis.

Sliding bearings 24y are fitted in the first holding frame 26, and the first holding frame 26 is slidable along a yaw slide shaft 25y. The yaw slide shaft 25y is fixed to the housing 214. Since the housing 214 is integrated with the lens barrel, the first holding frame 26 is movable in the yaw direction 22y with respect to the lens barrel.

A yaw coil 28y is attached to the fixing frame 23. The yaw coil 28y is placed in a magnetic circuit constituted by a yaw magnet 29y and a yaw yoke 210y, and when a current is flowed, the fixing frame 23 is driven in the yaw direction 22y. Furthermore, the fixing frame 23 is provided with a slit 211y and a light-emitting element 212y (infrared light-emitting diode), and the position of the fixing frame 23 in the yaw direction 22y is detected in combination with a light-receiving element 213y (semiconductor position detector PSD) arranged on the housing 214 as in the pitch direction.

As described above, the decentering moving section of the correction optical system 17a is constituted by the fixing frame 23 including the correction lens 21, the slits 211p and 211y, the light-emitting elements 212p and 212y, and the coils 28p and 28y, and is moved integrally with the correction lens 21.

The correction lens 21 is driven in the pitch direction 22p and the yaw direction 22y by driving the fixing frame 23 when the outputs from the light-receiving elements 213p and 213y are amplified by amplifiers 215p and 215y, and are input to the coils 28p and 28y. Thus, the outputs from the light-receiving elements 213p and 213y change. When the driving directions (polarities) of the coils 28p and 28y are set in directions to decrease the outputs from the light-receiving elements 213p and 213y, closed systems indicated by solid lines 218p and 218y are stabilized at points where the outputs from the light-receiving elements 213p and 213y become almost zero.

Compensation circuits 216p and 216y are circuits for further stabilizing the corresponding closed systems, and driving circuits 217p and 217y are circuits for compensating for currents to be supplied to the coils 28p and 28y.

The image stabilizing device 17 shown in FIG. 1 has an arrangement as described above.

When the sequence control circuit 16 (FIG. 1) as an external circuit supplies command signals 219p and 219y corresponding to image blur correction to the image stabilizing device 17, the correction lens 21 is driven very faithfully to the command signals in the pitch and yaw directions 22p and 22y, thus obtaining the image blur correction effect on the image plane.

Figure 2:
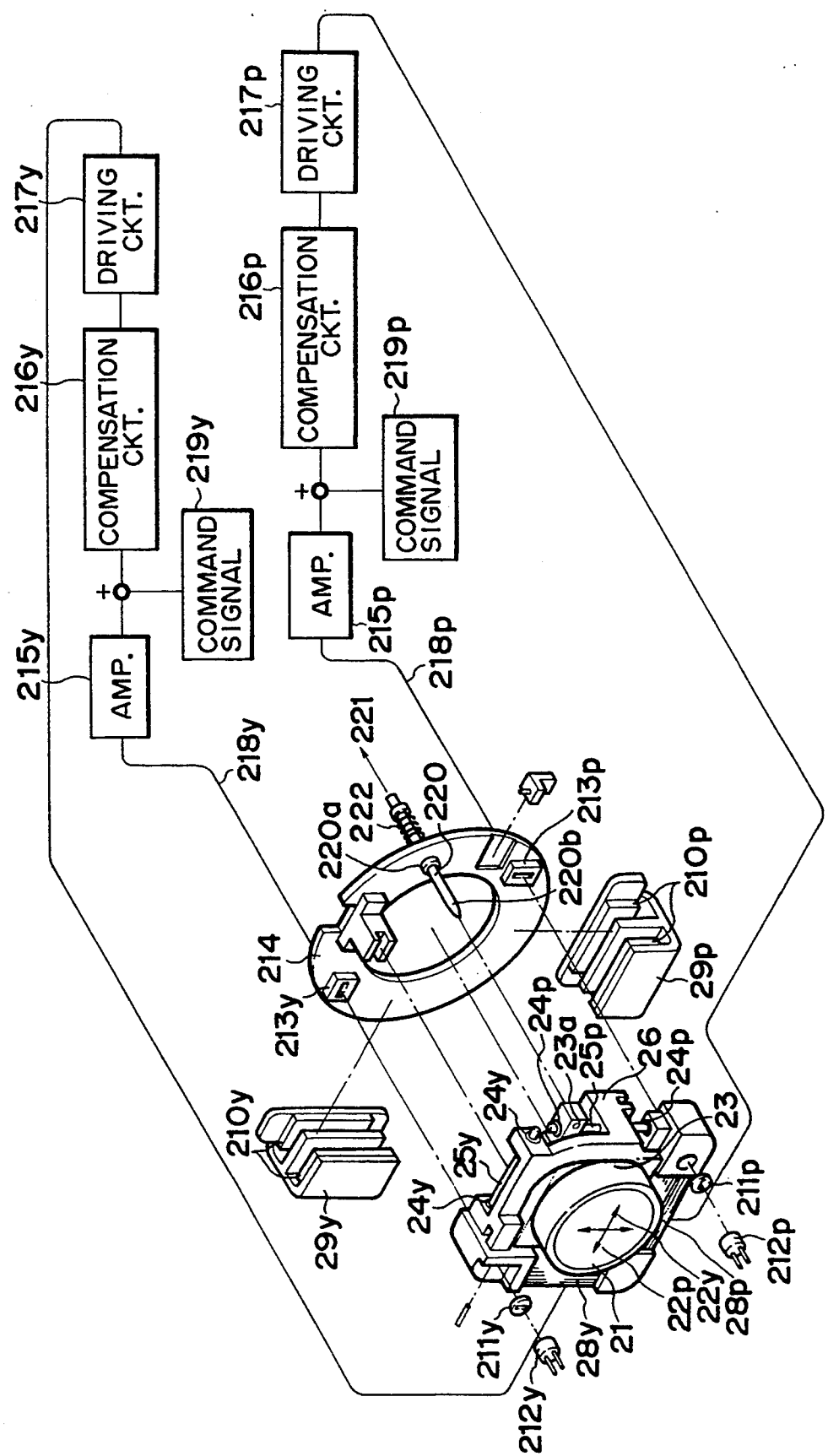
FIG. 2 is an exploded perspective view and a diagram showing a correction optical system and its signal processing system of the camera according to each embodiment of the present invention.

The lock mechanism 20 is constituted by a shaft 220 having two R-shaped ends and a spring 222 for biasing the shaft 220 in a direction of an arrow 221 in FIG. 2, and is attached onto the housing 214 integrated with the lens barrel using a portion 220a of the shaft 220 as a contact flange.

When one distal end 220b of the shaft 220 is inserted in a hole 23a of the fixing frame 23, the fixing frame 23 including the correction lens 21 is fixed to the housing 214 integrated with the lens barrel, and the optical axis of the correction lens 21 is fixed relative to the optical axis of the photographing lens.

Figure 3:
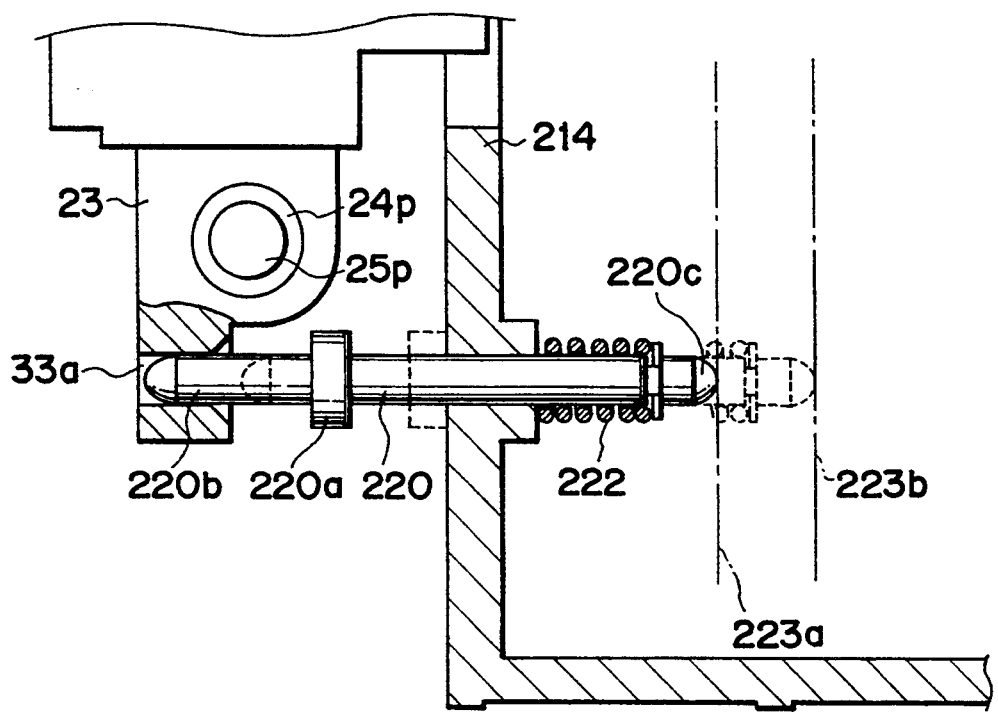
FIG. 3 is a sectional view showing a lock mechanism of a correction optical system according to the first embodiment of the present invention.

FIG. 3 is an enlarged sectional view of a portion around the shaft 220 as the lock mechanism and the hole 23a of the fixing frame 23 in FIG. 2 when viewed from the above in FIG. 2. At a solid-line position in FIG. 3, the distal end 220b of the shaft is fitted in the hole 23a of the fixing frame 23, and this state corresponds to a lock state for fixing the optical axis of the correction lens 21 relative to the optical axis of the photographing lens.

The other end 220c of the engaging distal end 220a of the shaft contacts a portion of the lens barrel. When this contact portion changes from 223a to 223b indicated by alternate long and short dashed lines, the shaft 220 is biased to a dotted-line position by the biasing force of the spring 222. At this position, the distal end 220a of the shaft is not engaged with the hole 23a of the fixing frame 23, and the correction lens 21 and the fixing frame 23 including it are swingable in the pitch and yaw directions 22p and 22y. This state corresponds to an unlock state wherein the optical axis of the correction lens 21 is not fixed relative to the optical axis of the photographing lens.

The structure of the lens barrel will be described below.

Figure 4:
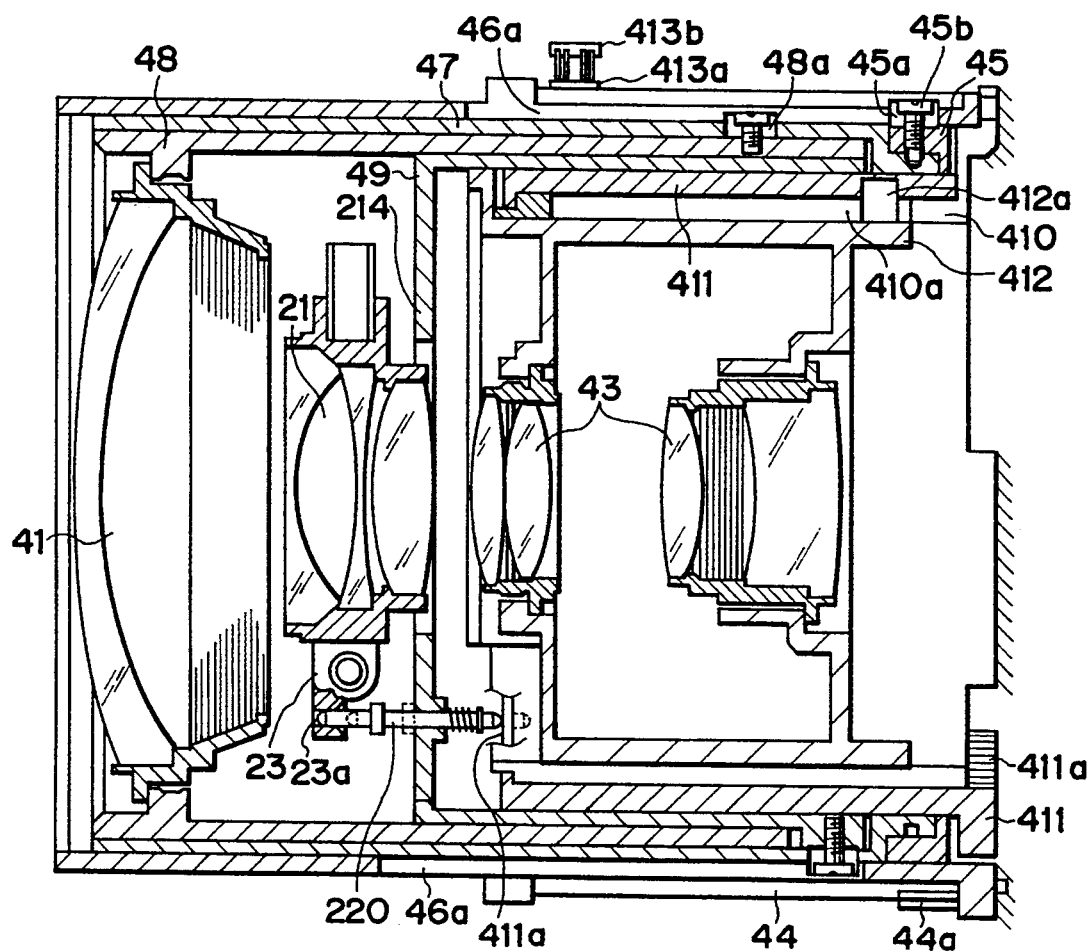
FIG. 4 is a sectional view showing a state of an optical system and a lens barrel in a collapsed state of the camera according to each embodiment of the present invention.
Figure 5:
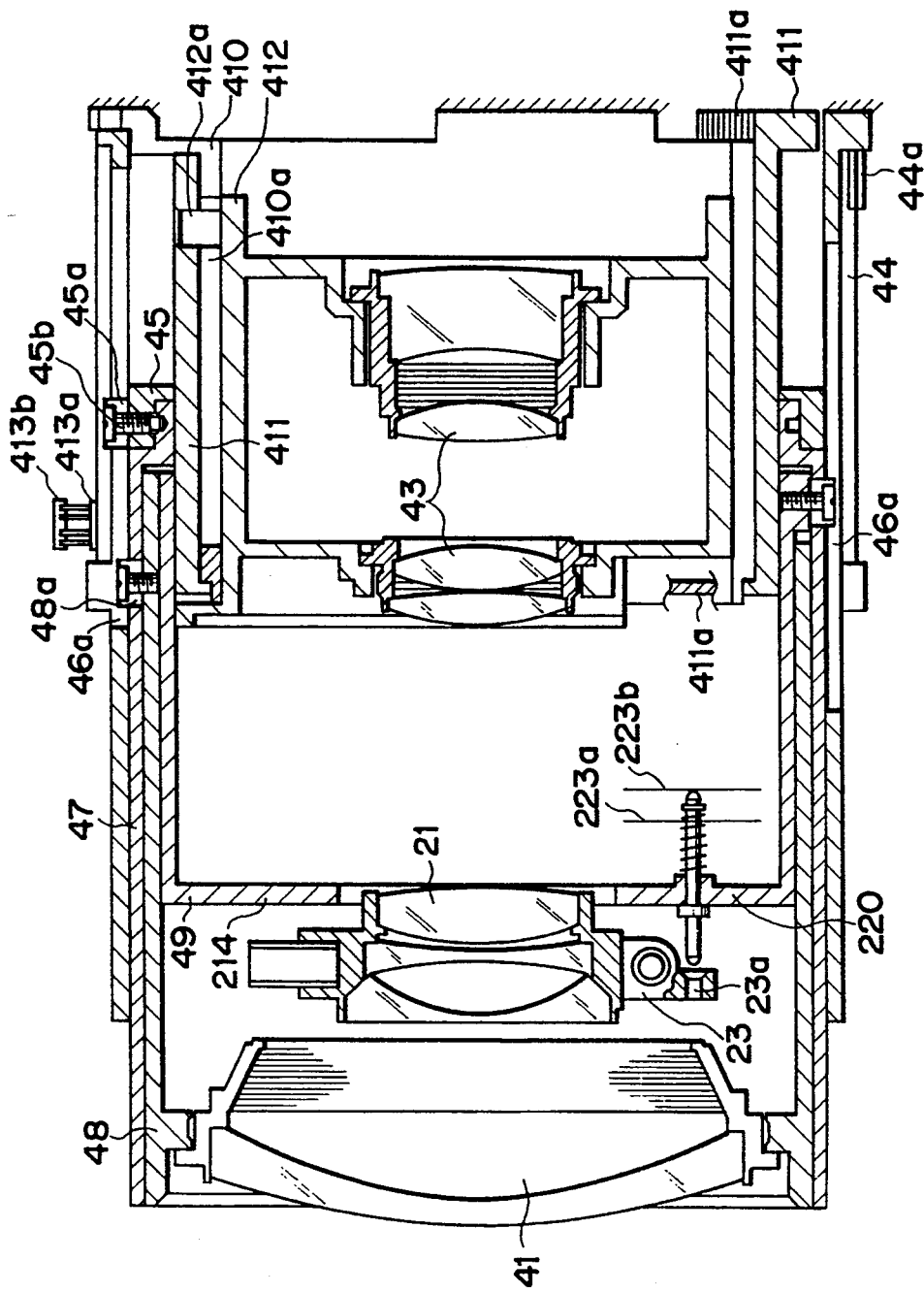
FIG. 5 is a sectional view showing a state of the optical system and the lens barrel in a photographing state of the camera according to each embodiment of the present invention.

FIG. 4 is a cross-sectional view of the camera in a collapsed state, and FIG. 5 is a cross-sectional view of the camera in a wide-end state as a photographing standby state. The functions of constituting members will be explained below.

Collapsible Mount•AF Cam Ring 44

A collapsible mount•AF cam ring 44 is allowed to perform only a pivotal movement. Cam grooves engaging with rollers 45a of a 1-2 group moving ring 45 (to be described later) are formed on the circumferential surface at three equal angular interval positions. An outer circumferential gear 44a provides a rotational driving force. A retracting operation and a focusing operation are performed by a single cam groove.

1-2 Group Moving Ring 45

A 1-2 group moving ring 45 is moved straight in the optical axis direction. The rollers 45a are provided on the circumferential surface at three equal angular interval positions. The ring 45 is engaged with the cam grooves of the collapsible mount•AF cam ring 44 and with straight grooves 46a of a fixing cylinder 46. The ring 45 is engaged with a 1-2 group cam ring 47 (to be described later) through a roller shaft pin 45b, and is moved in the optical axis direction together with 1- and 2-group lens barrels 48 and 49 (to be described later).

Fixing Cylinder 46

A fixing cylinder 46 supports the 1- and 2-group lens barrels 48 and 49, and the 1-2 group moving ring 45, and has a total of six straight grooves 46a to be engaged with rollers of these barrels and ring at three equal angular interval positions each on the circumferential surface. One end of the fixing cylinder 46 is fixed to the camera main body.

1-2 Group Cam Ring 47

The 1-2 group cam ring 47 has six cam grooves to be engaged with rollers provided at three equal angular interval positions of each of the 1- and 2-group lens barrels 48 and 49. The ring 47 is engaged with a 3-group cam ring 411 through a key, and only a rotational direction is transmitted. The cam grooves perform an operation in the optical axis direction in a zooming mode. The ring 47 is engaged with the 1-2 group moving ring 45 through the roller shaft pin 45b, and a moving force in the optical axis direction is transmitted.

1-Group Lens Barrel 48

Rollers 48a are provided at three equal angular interval positions on the circumferential surface of the lens barrel 48, and are engaged with the straight grooves 46a of the fixing cylinder 46 and the cam grooves of the 1-2 group cam ring 47. The lens barrel 48 supports a first photographing lens group (including two lenses) 41.

2-Group Lens Barrel 49

Rollers 49a are provided at three equal angular interval positions on the circumferential surface of the lens barrel 49, and are engaged with the straight grooves 46a of the fixing cylinder 46 and the cam grooves of the 1-2 group cam ring 47. The correction optical system 17a and the lock mechanism 20 are mounted on the lens barrel 49, and the lens barrel 49 is integrated with the housing 214 as a portion of the correction optical system 17a. The lens barrel 49 supports a second photographing lens group (including three lenses) 21.

3-Group Fixing Cylinder 410

A 3-group fixing cylinder 410 has straight grooves 410a to be engaged with rollers 412a of a 3-group lens barrel 412 at three equal angular interval positions on the circumferential surface. One end of the cylinder 410 is fixed to the camera main body.

3-Group Cam Ring 411

A 3-group cam ring 411 is allowed to perform only a rotation. The ring 411 has cams to be engaged with the rollers 412a of the 3-group lens barrel 412 at three equal angular interval positions on the circumferential surface. The ring 411 obtains a rotational driving force in the zooming mode by its inner circumferential gear 411a, and since the ring 411 is engaged with the 1-2 group cam ring 47 through a key, it also transmits the rotational driving force to the 1-2 group cam ring 47. The gear 411a of the ring 411 contacts the shaft 220 in a collapsed state.

3-Group Lens Barrel 412

The 3-group lens barrel 412 has the rollers 412a to be engaged with the cams of the 3-group cam ring 411 and the straight grooves 410a of the 3-group fixing cylinder 410 at three equal angular interval positions. The lens barrel 412 is moved in the optical axis direction in the zooming mode. The lens barrel 412 supports a third photographing lens group (including four lenses) 43.

Note that the first photographing lens group 41 includes two lenses. The second photographing lens group 21 including three lenses corresponds to the correction lens in FIG. 2, is supported by the fixing frame 23, and swings in a plane perpendicular to the optical axis to perform an image blur correction operation. The third photographing lens group 43 includes four lenses.

A photographing lens optical system is a zoom lens consisting of three lens groups. More specifically, the optical system is constituted by, from the object side, the first photographing lens group (including two lenses) 41 and the 1-group lens barrel 48 for supporting it, the second photographing lens group (including three lenses) corresponding to the correction lens 21 of the correction optical system 17a in FIG. 2, the fixing frame 23, and the 2-group lens barrel 49 integrated with the housing 214, and the third photographing lens group (including four lenses) and the 3-group lens barrel 412 for supporting it.

The lock mechanism 20 in FIG. 1 is constituted by the shaft 220 and the spring 222 on the housing 214 of the 2-group lens barrel 49. In FIGS. 3 and 4, the lock mechanism 20 is in a lock state wherein the shaft 220 is fitted in the hole 23a of the fixing frame 23.

When the main switch SWM in FIG. 1 is turned on, the first photographing lens group 41 and the second photographing lens group 21 as the correction lens are moved from the collapsed state shown in FIG. 4 toward the object side, and are then set in a zoom wide-end state shown in FIG. 5.

When the first photographing lens group 41, the second photographing lens group 21 as the correction lens, and the third photographing lens group 43 are moved from the state shown in FIG. 5 toward the object side, a zoom telephoto-end state is attained.

The focusing operation at each zoom position is performed by moving the first photographing lens group 41 and the second photographing lens group 21 as the correction lens in the optical axis direction.

The movement of the photographing lens system and the structure of the lens barrel will be described below.

The fixing cylinder 46 and the 3-group fixing cylinder 410 are fixed to the camera main body, and are formed with the straight grooves for the lens barrel rollers in the optical axis direction. The collapsible mount•AF cam ring 44, which is allowed to perform only a pivotal motion, is arranged outside the fixing cylinder 46, and is formed with cams for performing the retracting and AF operations, which cams are engaged, with the rollers 45a of the 1-2 group moving ring 45 movable in only the optical axis direction, through the straight grooves of the fixing cylinder 46. The rotational driving force is transmitted by the gear portion 44a formed on the outer circumferential surface of the collapsible mount•AF cam ring 44, and the collapsible mount•AF cam ring 44 is rotated by a predetermined rotational angle. At this time, the rollers 45a and the 1-2 group moving ring 45 are moved from the state shown in FIG. 4 toward the object side along the cams of the collapsible mount•AF cam ring 44. Together with the 1-2 group moving ring 45, the 1-2 group cam ring 47, the 1- and 2-group lens barrels 48 and 49, and the first and second photographing lens groups 41 and 21 supported by these lens barrels are also moved from the state shown in FIG. 4 toward the object side.

The collapsible mount•AF cam ring 44 is rotated by the predetermined rotational angle. The former half of the predetermined rotational angle of the collapsible mount•AF cam ring 44 is used for performing movement from the collapsed state to the photographing standby state at the wide end, and the latter half thereof is used for the auto-focus operation as the focusing operation in each zoom state. In the photographing standby state at the wide end, the optical system is focused at the infinity position.

A position flexible printed board 413a indicating the collapsed state, the photographing standby state at the wide end, the infinity position, and the focusing positions in the rotational direction is arranged on the outer circumferential portion of the collapsible mount•AF cam ring 44. A position contact 413b is fixed to the camera main body. Thus, the lens barrel state can be detected based on the rotational angle of the collapsible mount•AF cam ring 44, and is used in driving control of the collapsible mount•AF cam ring 44.

The lens barrel operation and the operation of the shaft 220 of the lock mechanism 20 upon predetermined rotation of the collapsible mount•AF cam ring 44 will be described below.

In FIG. 4, the other end 220c of the shaft 220 having the distal end 220b engaged with the hole 23a of the fixing frame 23 is biased by the spring 222 to be in contact with a surface 411a, perpendicular to the optical axis, of the 3-group cam ring 411. Thus, the lock mechanism 220 is set in the lock state.

Upon predetermined rotation of the collapsible mount•AF cam ring 44 from the collapsed state to the photographing standby state at the wide end, the 1- and 2-group lens barrels 48 and 49 are moved toward the object side. In this case, the photographing standby state at the wide end in FIG. 5 is reached while the relative interval in the optical axis direction between the surface 411a, perpendicular to the optical axis, of the 3-group cam ring 411 and the housing 214 integrated with the 2-group lens barrel 49 and constituting a surface perpendicular to the optical axis is being widened.

In this case, the shaft 220 is moved to a position 223b in FIG. 5 while the end portion 220c of the shaft is in contact with the surface 411a, and is disengaged from the hole 23a of the fixing frame 23. Thus, the lock mechanism 20 is set in an unlock state.

In the unlock state, the second photographing lens group 21 as the correction lens and the fixing frame 23 including it are swingable in a plane perpendicular to the optical axis, and perform an image blur correction operation as the image stabilizing device 17 in FIG. 2.

The zooming operation is an operation from the photographing standby state at the wide end to the telephoto end in FIG. 5, and the rotational driving force is transmitted to the inner circumferential gear 411a of the 3-group cam ring 411, which is allowed to perform only a pivotal motion, in FIG. 5. Since the rollers 412a of the lens barrel 412 are engaged with the cams formed on the 3-group cam ring 411 through the straight grooves 410a of the 3-group fixing cylinder 410, the 3-group lens barrel 412 is moved from the position in FIG. 5 toward the object side upon rotation of the 3-group cam ring 411.

The 3-group cam ring 411 is key-coupled to the 1-2 group cam ring 47, and can transmit only a rotation. The rotation of the 3-group cam ring 411 moves the rollers 48a and 49a of the 1- and 2-group lens barrels 48 and 49, which rollers are engaged with the cams formed on the 1-2 group cam ring 47, along the straight grooves 46a of the fixing cylinder 46, thereby moving the first photographing lens group 41 and the second photographing lens group 21 as the correction lens, which are supported by the 1- and 2-group lens barrels 48 and 49, from the position shown in FIG. 5 toward the object side.

In the zooming operation in the telephoto-end direction from the photographing standby state at the wide end shown in FIG. 5, the interval between the surface 411a, perpendicular to the optical axis, of the 3-group cam ring 411, which is allowed to perform only a rotation, and the housing 214 integrated with the 2-group lens barrel 49 and constituting a surface perpendicular to the optical axis never becomes narrower than that in the photographing standby state at the wide end shown in FIG. 5, and the zooming operation does not influence the operation of the shaft 220, i.e., the lock/unlock state.

When the main switch SWM in FIG. 1 is turned off, the 3-group cam ring 411 is rotated from each zoom position in a direction opposite to the above-mentioned direction to attain the photographing standby state at the wide shown in FIG. 5. The collapsible mount•AF cam ring 44 is then rotated in a direction opposite to the above-mentioned direction to attain the collapsed state shown in FIG. 4. Thus, the shaft 220 is operated from the position where its end portion 220c contacts the surface 411a, perpendicular to the optical axis, of the fixed 3-group cam ring 411, and is engaged with the hole 23a of the fixing frame 23, thus attaining the lock state.

When the main switch SWM is turned off, the correction optical system 17a in FIG. 1 receives a command signal from the sequence control circuit 16 (FIG. 1), so that the hole 23a of the fixing frame 23 is set at the lock position. Lock centering is actuated for a predetermined period of time necessary for setting the hole 23a of the fixing frame 23 at the lock position, thus improving reliability of the lock operation.

Similarly, in the unlock state after the main switch SWM is turned on, the lock centering is actuated for a predetermined period of time necessary for setting the hole 23a of the fixing frame 23 at the unlock position, thus improving reliability of the unlock operation.

The optical axis of the correction lens 21 (second photographing lens group) fixed at the lock position is caused to coincide with the optical axis of the photographing lens, thus starting the image blur correction operation from the center of a correction range.

When neither of the switches SW1 and SW2, which are respectively turned on at the first and second stroke positions of the release button, are turned on within a predetermined period time, the collapsed state shown in FIG. 4 is automatically set, and the fixing frame 23 including the swingable correction lens 21 is set in a lock state. In this case, when the switch SW1 is turned on again, the state of the camera is changed from the collapsed state in FIG. 4 to the photographing standby state at the wide end in FIG. 5, and the above-mentioned unlock state is set, thus starting the image blur correction operation.

According to the first embodiment described above, in synchronism with the operation of the lens barrel from the collapsed state to the photographing standby state, the swingable correction optical system 17a (the correction lens 21 thereof) is unlocked. In a non-photographing state, the swingable correction optical system 17a is locked upon attaining a collapsed state. For this reason, a photographer can fix and release the optical axis of the correction optical system 17a relative to the optical axis of the photographing lens in a series of photographing operations.

This feature can provide the following advantages.
1) A photographer is not forced to perform cumbersome operations for locking and unlocking the correction optical system 17a in addition to the photographing operations.
2) Since the camera is set in the collapsed state in a non-photographing state, the correction optical system 17a (the correction lens 21 thereof and the like) is fixed, and can be prevented from being unnecessarily set in an image blur correction state or electrically holding a predetermined position. As a result, a battery can be prevented from being unnecessarily wasted. Furthermore, the function of the correction optical system 17a can be prevented from being damaged by a shock due to an unexpected vibration by, e.g., carrying of the camera.
3) In the operation for locking/unlocking the correction lens 21 and the like of the correction optical system 17a, a change in relative interval in the optical axis direction between the lens barrels upon a retracting operation of the lens barrel is utilized and is used as a driving force. Thus, no new actuator is required, and a large operating force can be obtained.

Figure 6:
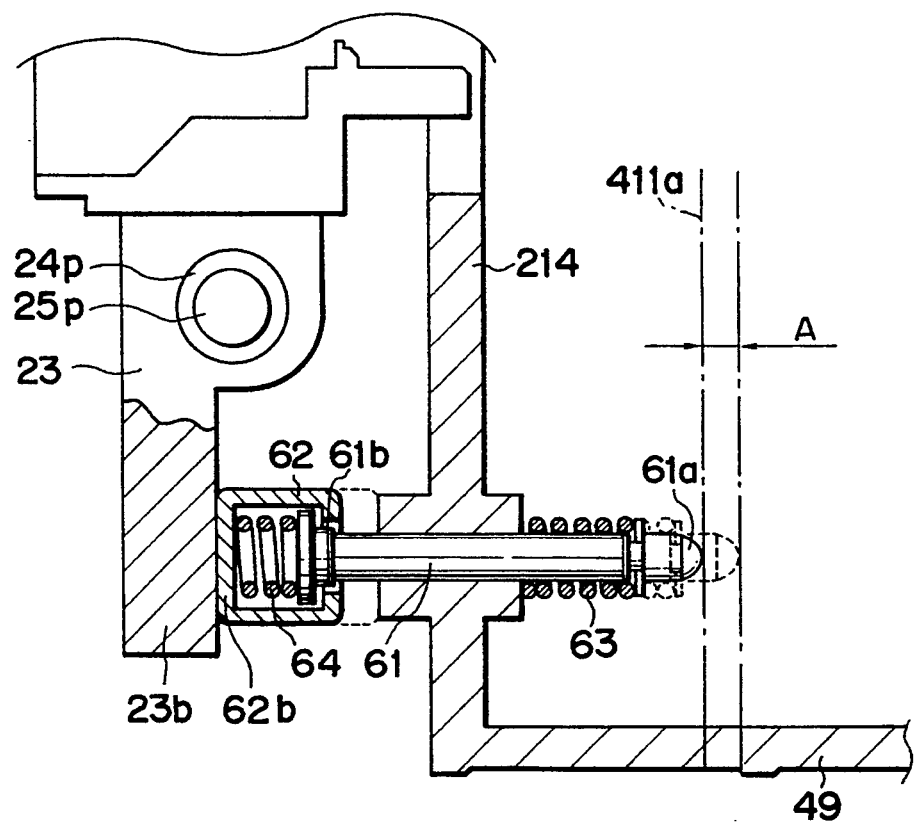
FIG. 6 is a sectional view showing a lock mechanism of a correction optical system according to the second embodiment of the present invention.

FIG. 6 shows the arrangement of a lock mechanism 20 according to the second embodiment of the present invention. Since the arrangement of the camera shown in FIG. 1, and the lens barrel operations shown in FIGS. 4 and 5 are the same as those in the first embodiment described above, a detailed description thereof will be omitted.

In FIG. 6, solid-line portions of a contact member 62 and a shaft 61 represent positions of a lens barrel in a collapsed state in FIG. 4. Dotted-line portions represent positions of the lens barrel at the wide end in a photographing standby state in FIG. 5.

The shaft 61 is attached to a housing 214 integrated with a 2-group lens barrel 49, and an end portion 61a of the shaft 61 indicated by the solid line contacts a surface 411a, perpendicular to the optical axis, of a 3-group cam ring 411 (FIG. 4). A spring 63 biases the shaft 61 in the contact direction.

The contact member 62 is biased by a spring 64 toward a flat portion 23b as a portion of a fixing frame 23, so that it is almost fitted on an end portion 61b of the shaft 61. In this state, a flat portion 62b of the contact member 62 contacts the flat portion 23b. The flat portion 62b of the contact member 62 and the flat portion 23b of the fixing frame 23 fix the fixing frame 23 by a frictional force based on the biasing force of the spring 64.

When the shaft 61 is moved in the direction of the dotted-line portion, the contact member 62 is biased by the spring 64 to have a stepped portion of the end portion 61b of the shaft 61 as a contact flange.

In this manner, the fixing frame 23 including a swingable correction lens 21 (FIG. 2) is set in a lock state.

The flat portion 23b of the fixing frame 23 and the flat portion 62b of the contact member 62 are subjected to a surface treatment to increase the frictional coefficient.

In the photographing standby state at the wide end, the relative interval in the optical axis direction between the 3-group cam ring 411 fixed to the camera main body and the housing 214 integrated with the 2-group lens barrel 49 becomes larger than that in the collapsed state of the lens barrel. In this state, the shaft 61 and the contact member 62 are moved by a moving amount A by the biasing force of the spring 63, and the contact flange portion is located at a position indicated by the dotted line.

In this state, the flat portion 23b of the fixing frame 23 and the flat portion 62b of the contact member 62 do not contact with each other, and no frictional force for restricting the fixing frame 23 is generated. The fixing frame 23 is set in an unlock state. As a result, the fixing frame 23 including the correction lens 21 of a correction optical system 17a is swingable, and performs an image blur correction operation.

As long as the flat portion 23b of the fixing frame 23 does not contact the flat portion 62b of the contact member 62, no frictional force for restricting the fixing frame 23 is generated. Thus, the moving amount A can be very small.

At this time, the change amount of the relative interval in the optical axis direction between the 3-group cam ring 411 and the housing 214 integrated with the 2-group lens barrel 49 in the collapsed state and the photographing standby state is set to be larger than the moving amount A.

In the lock mechanism 20 of the first embodiment described above, the engagement between the shaft 220 and the hole 23a is interlocked with a change in relative interval in the optical axis direction between the lens barrels in the two states, i.e., the collapsed and photographing standby states, thus attaining the lock and unlock states. However, in the second embodiment, since the lock and unlock states are attained by utilizing the frictional force upon contact between the two members in place of the engagement between the hole 23a and the shaft portion (220b), the reliability of the lock-/unlock state can be assured without the lock centering actuation unlike in the first embodiment.

According to the second embodiment described above, in synchronism with the operation of the lens barrel from the collapsed state to the photographing standby state, the swingable correction optical system 17a (the correction lens 21 thereof) is unlocked. In a non-photographing state, the swingable correction optical system 17a is locked upon attaining a collapsed state. For this reason, a photographer can fix and release the optical axis of the correction optical system 17a relative to the optical axis of the photographing lens in a series of photographing operations.

This feature can provide the following advantages.
1) A photographer is not forced to perform cumbersome operations for locking and unlocking the correction optical system 17a in addition to the photographing operations.
2) Since the camera is set in the collapsed state in a non-photographing state, the correction optical system 17a (the correction lens 21 thereof and the like) is fixed, and can be prevented from being unnecessarily set in an image blur correction state or electrically holding a predetermined position. As a result, a battery can be prevented from being unnecessarily wasted. Furthermore, the function of the correction optical system 17a can be prevented from being damaged by a shock due to an unexpected vibration by, e.g., carrying of the camera.
3) In the operation for locking/unlocking the correction lens 21 and the like of the correction optical system 17a, the movement in the optical axis direction between the lens barrels upon a collapsing operation of the lens barrel is utilized as an actuating force. Thus, no new actuator is required. Furthermore, a large actuating force can be obtained.

4) Even when the change amount of the relative interval in the optical axis direction between the lens barrels in the two states, i.e., the collapsed and photographing standby state is small, the lock mechanism of the second embodiment can be used. This allows to lock and unlock the correction lens 21 and the like of the correction optical system 17a in a small space.

5) No lock centering actuation is required.

The third embodiment of the present invention will be described below with reference to FIG. 7 and the like.

A difference between the third embodiment and the above-mentioned first and second embodiments is that an actuator is used in a lock mechanism, and the correction optical system is locked/unlocked by driving an actuator upon detection of the photographing standby state in place of utilization of a change in relative interval in the optical axis direction between the lens barrels in the two states, i.e., the collapsed and photographing standby state. Since the arrangement of the camera shown in FIG. 1, and the lens barrel operations shown in FIGS. 4 and 5 are the same as those in the first and second embodiments described above, a detailed description thereof will be omitted.

A lock mechanism of the third embodiment will be described below with reference to FIG. 7.

Figure 7:
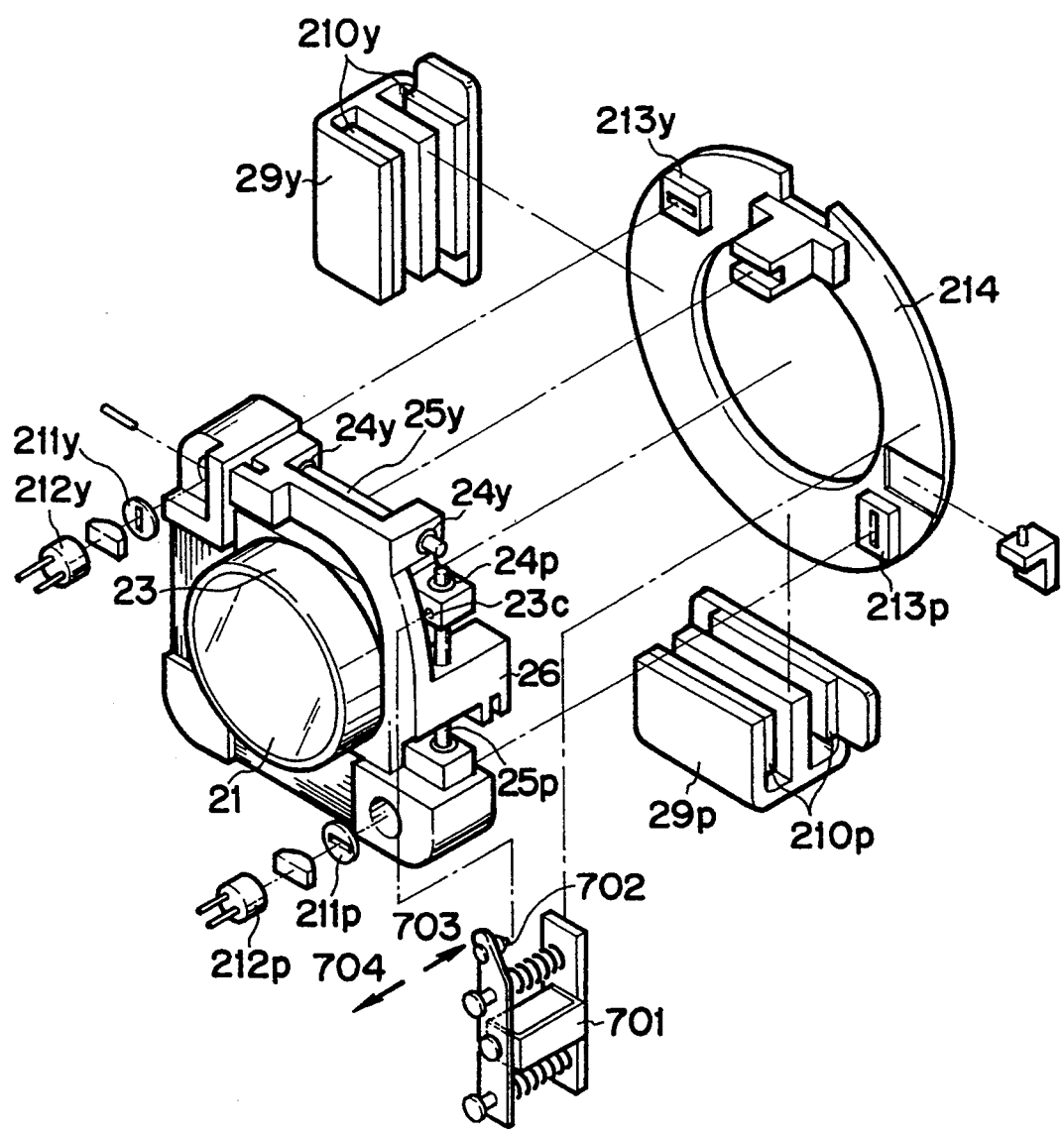
FIG. 7 is a sectional view showing a lock mechanism of a correction optical system according to the third embodiment of the present invention.

In FIG. 7, a lock mechanism is designated by 701. A conical projecting portion 702 as an engaging portion is linearly moved in a direction of an arrow 703, and is urged against a conical recess portion 23c as a receiving portion of a fixing frame 23 for holding a correction lens 21. The projecting portion 702 and the recess portion 23c are engaged with each other, so that the central lines of concave and convex cones coincide with each other.

In this manner, the movement of the fixing frame 23 integrated with the correction lens 21 in two orthogonal directions (a pitch direction 42p and a yaw direction 42y) perpendicular to the optical axis is regulated, and the correction lens 21 is fixed. That is, a lock state is attained.

When the fixing state of the correction lens 21 is released, the conical projecting portion 702 is moved in a direction of an arrow 704 opposite to the arrow 703, and is separated from the conical recess portion 23c as a receiving portion. Thus, the fixing frame 23 integrated with the correction lens 21 is movable in a plane perpendicular to the optical axis. That is, an unlock state is attained.

The lock mechanism 701 for driving the conical projecting portion 702 as the engaging portion in the directions of the arrows 703 and 704 is constituted as a unit, is fixed integrally with a housing 214 (FIG. 7), and also constitutes a unit with a correction optical system 17a.

Figure 8:
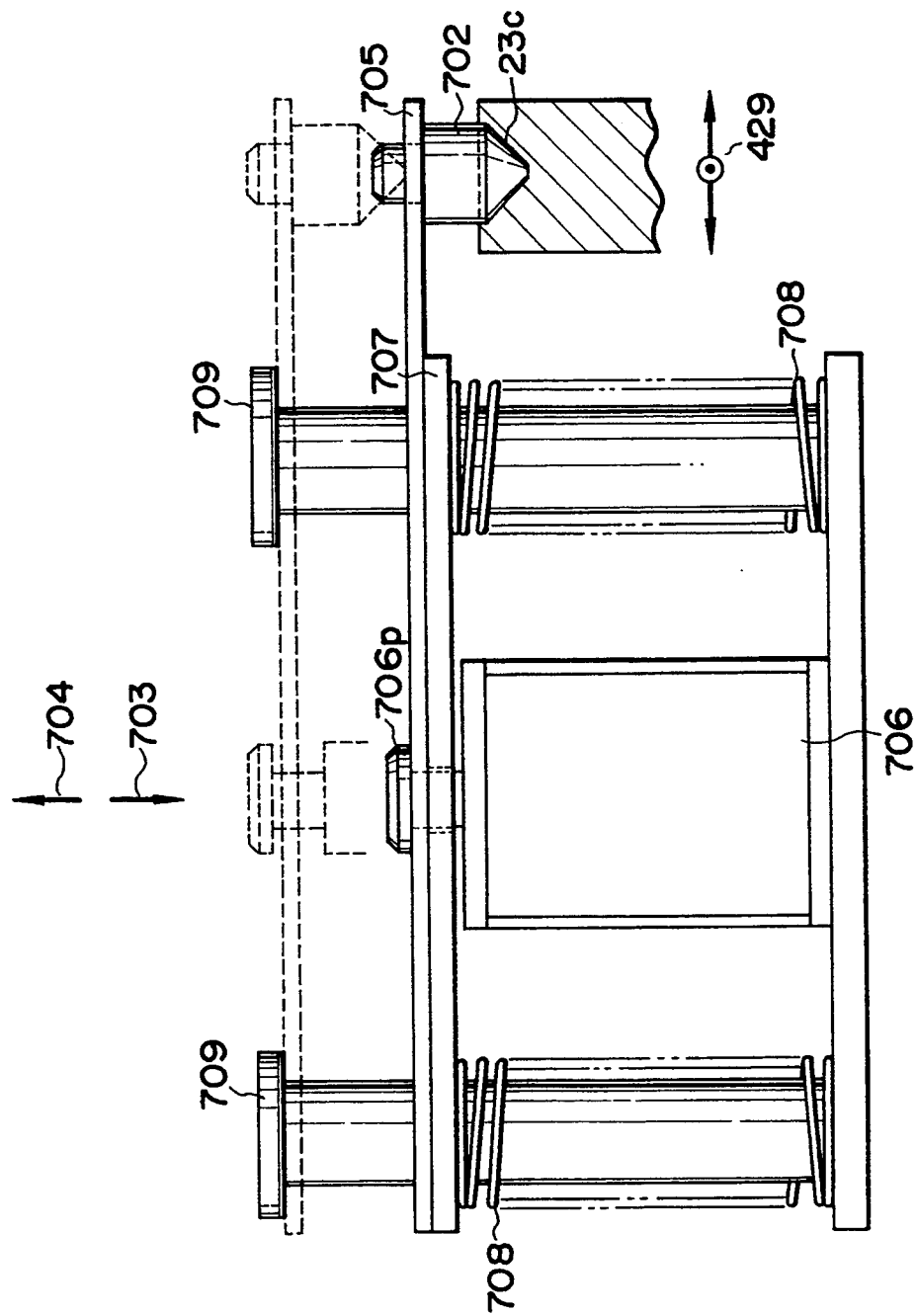
FIG. 8 is a side view for explaining the operating state of the lock mechanism shown in FIG. 7.

The details of the operation of the lock mechanism 701 will be described below with reference to FIG. 8.

The conical projecting portion 702 is attached to a plate 705, is regulated by two shafts by hole engagement together with the plate 705, and is slidable in the direction of the arrow 703 or 704, The plate 705 has spring characteristics so as to absorb a shock upon engagement of the recess portion 23c and the projecting portion 702, and to urge these portions. The lock state of the projecting portion 702 and the plate 705 is indicated by a solid line, and the unlock state thereof is indicated by a dotted line.

A cylindrical plunger 706p, which is linearly moved in the directions of the arrows 703 and 704, and a known plunger type latch solenoid 706 as a combination of a permanent magnet and a solenoid coil are coupled to the plate 705 and a plate 707 at the distal end of the plunger 706, and are biased by a coil spring 708 in the direction of the arrow 704 as a disengaging direction.

In the lock state, the plunger 706p is magnetically latched by the permanent magnet of the latch solenoid.

In the unlock operation, the solenoid coil of the latch solenoid 706 is energized to cancel the magnetic force of the permanent magnet, and the plunger 706p is moved in the direction of the arrow 704 as the unlock direction by the biasing force of the coil spring 708, which acts through the plate 707. When the plates 705 and 707 abut against a shaft 709, the unlock state is established.

In the lock operation, the solenoid coil of the latch solenoid 706 is energized in a direction opposite to that in the unlock operation, i.e., to increase the magnetic force of the permanent magnet. Thus, the plunger 706p receives a force in the direction of the arrow 703 as the lock direction, and overcomes the biasing force of the coil spring 708. Thus, the plunger 706p is moved to return the recess portion 23c as the receiving portion disengaged from the lock position to the engaging state position, thereby setting the engaging state. In this manner, the plunger type solenoid 706 is energized only when the lock and unlock states are switched, and need not be energized to hold one of the two states.

Figure 9:
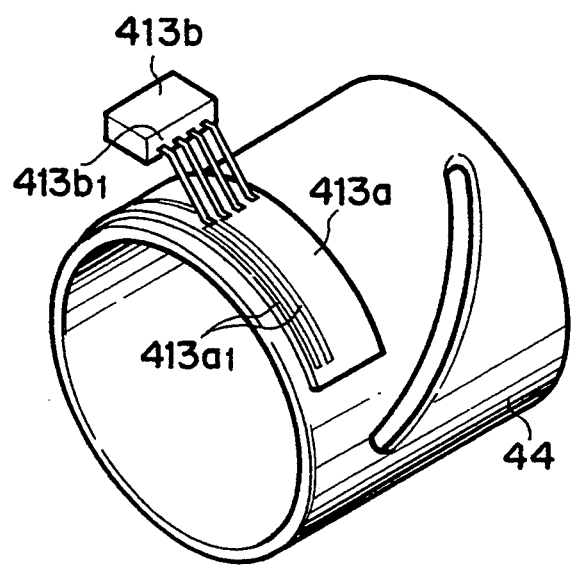
FIG. 9 is a perspective view showing the structure of a collapsible mount•AF cam ring and its peripheral portion of the camera according to each embodiment of the present invention.
Figure 10:
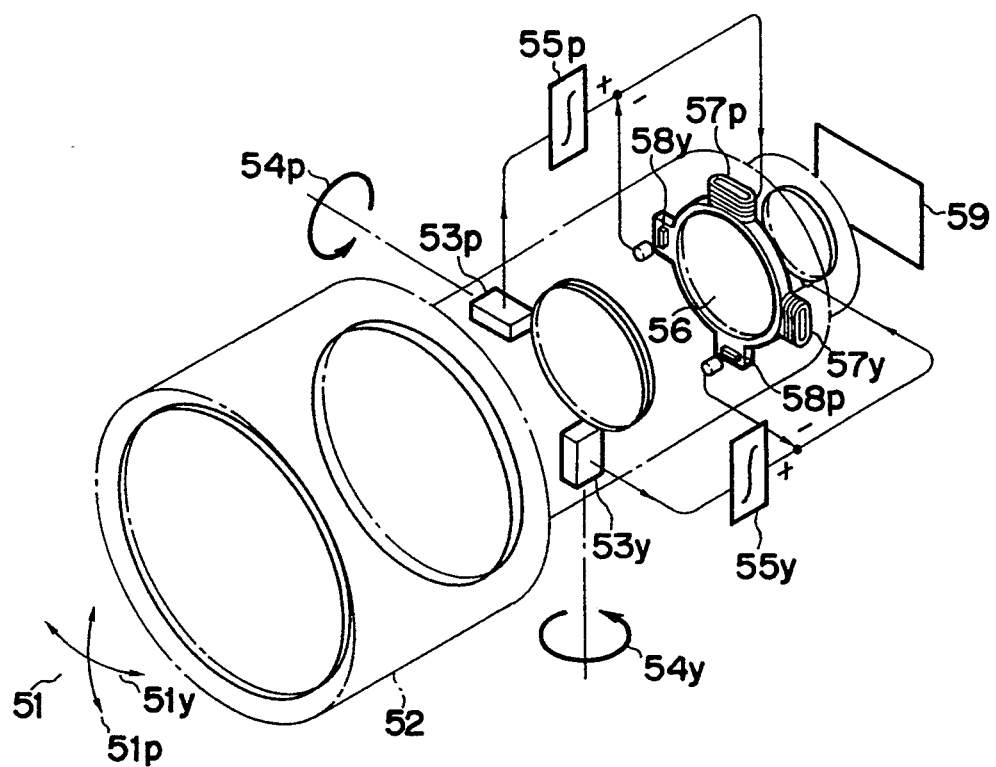
FIG. 10 is a schematic perspective view showing an arrangement of a vibration suppression device arranged in a conventional camera.

As shown in FIG. 9, a position flexible printed board 413a indicating a collapsed state, a photographing standby state at the wide end, an infinity position, and focusing positions in the rotational direction, and a position contact 413b fixed to the camera main body are arranged on the outer circumferential portion of a collapsible mount•AF cam ring 44. These members constitute a position switch, and detect a lens barrel state from the rotational angle of the collapsible mount•AF cam ring 44. The detection result is used in driving control of the collapsible mount•AF cam ring 44.

Portions 413a1 of the printed board 413a and portions 413b1 of the contact 413b detect whether a lens barrel is in the collapsed state or the photographing standby state at the wide end and each zoom focusing state. Portions 413a2 and 413b2 have a role for precisely indicating each zoom focusing position.

As described above, when the position switch (413a and 413b) detects that the lens barrel state is switched from the collapsed state to the photographing standby state at the wide end, a sequence control circuit 16 (FIG. 1) energizes the latch solenoid 706 in the unlock direction for a predetermined period of time, and the lock mechanism 701 arranged on the housing 214 integrated with the 2-group lens barrel 49, and having the plunger 706p and the latch solenoid 706 is set in the unlock state. When the position switch detects that the lens barrel state is switched from the photographing standby state at the wide end to the collapsed state, the latch solenoid 706 is energized in the lock direction for a predetermined period of time, and the lock mechanism 701 is set in the lock state.

In this manner, since the lock mechanism 701 does not use a change in relative interval in the optical axis direction between the lens barrels in the two states, i.e., the collapsed and photographing standby states, the arrangement of members interlocking with the change in relative interval in the optical axis direction between the lens barrels need not be considered, and the correction optical system and the lens barrel with the lock mechanism can also be arranged regardless of the change in relative interval in the optical axis direction between the lens barrels.

In the first and second embodiments, when the switches SW1 and SW2, which are respectively turned on at the first and second stroke positions of the release button, are not turned on within a predetermined period time, the collapsed state shown in FIG. 4 is automatically set, and the fixing frame 23 including the swingable correction lens 21 is set in a lock state. However, since the lock mechanism can be locked/unlocked in response to a command signal from the sequence control circuit 16 (FIG. 1), it can be locked without setting the collapsed state.

In this case, when the switch SW1 is turned on again, an image blur correction operation can be started in the above-mentioned unlock state from the corresponding lens barrel state.

In this manner, since the lock mechanism can be interlocked with other switches, various lock/unlock operations such as a lock operation during charging of an electronic flash device, a lock operation for inhibiting an image blur correction operation in the photographing standby state, and the like can be performed. In addition, the photographing standby state need not be limited to the wide end.

According to the third embodiment described above, in synchronism with the operation of the lens barrel from the collapsed state to the photographing standby state, the swingable correction optical system 17a (the correction lens 21 thereof) is unlocked. In a non-photographing state, the swingable correction optical system 17a is locked upon attaining a collapsed state. For this reason, a photographer can fix and release the optical axis of the correction optical system 17a relative to the optical axis of the photographing lens in a series of photographing operations.

1) A photographer is not forced to perform cumbersome operations for locking and unlocking the correction optical system 17a in addition to the photographing operations.
2) Since the camera is set in the collapsed state in a non-photographing state, the correction optical system (the correction lens thereof and the like) is fixed, and can be prevented from being unnecessarily set in an image blur correction state or electrically holding a predetermined position. As a result, a battery can be prevented from being unnecessarily wasted. Furthermore, the function of the correction optical system can be prevented from being damaged by a shock due to an unexpected vibration by, e.g., carrying of the camera.
3) Since the correction optical system and the lock mechanism can be arranged regardless of a change in relative interval in the optical axis direction between the lens barrels, the degree of freedom of the arrangement of these members in the lens barrel can be greatly increased.
4) Since the lock mechanism can be interlocked with other switches, the lock and unlock operations can be performed with very high operability.
5) Since an actuator which is energized in only the lock and unlock operations is used, no electric power for holding a state is consumed, and the lock mechanism with very high efficiency can be provided.
6) The correction lens and the like of the correction optical system can be locked and unlocked by addition of a small number of parts and in a small space.

As described above, according to each of the above embodiments, a locking control member for operating a locking member in synchronism with a movement of a lens barrel for holding an optical system including a correction optical member between a collapsed state and a photographing standby state is arranged. The locking member is operated in synchronism with the projecting operation of the lens barrel from the collapsed state to the photographing standby state or the retracting operation of the lens barrel from the photographing standby state to the collapsed state, so that the correction optical member is set in a swingable state or is locked at a predetermined position. Therefore, the correction optical member can be locked and unlocked without wasting of electrical power or requiring cumbersome operations.

In each of the above embodiments, a vibration suppression member exemplifies a type for performing vibration suppression by deflecting a light beam upon movement in a direction substantially perpendicular to the optical axis. However, the present invention can provide the same effect as described above when a vibration suppression member of another type, e.g., one having a variable vertical angle prism is used.

What is claimed is:

1. An optical apparatus having a vibration suppression function, comprising:
 a lens member movable at least to positions corresponding to non-photographing and photographing preparation states;
 a vibration suppression member for optically correcting a blur of image; and
 a locking member for selectively switching said vibration suppression member between an operative state and an inoperative state, said locking member switching said vibration suppression member to the inoperative state in response to a movement of said lens member to the position corresponding to the non-photographing state.

2. An apparatus according to claim 1, wherein said vibration suppression member is movably supported in an optical path of the light beam for said lens member and is moved to deflect the light beam for optically correcting the blur, and said locking member switches said vibration suppression member to the inoperative state by fixing said vibration suppression member.

3. An apparatus according to claim 1, wherein said lens member is movable at least to the position corresponding to said non-photographing state wherein said lens member is retracted, and to the position corresponding to said photographing preparation state wherein said lens member projects.

4. An apparatus according to claim 1, wherein said locking member switches said vibration suppression member from said inoperative state to said operative state according to the movement of said lens member from the position corresponding to said non-photographing state to the position corresponding to said photographing preparation state.

5. An apparatus according to claim 1, wherein said locking member includes a rod-like member arranged in a direction substantially parallel to an optical axis direction of said lens member, and said rod-like member is moved in synchronism with a movement of said lens member and contacts a portion of said vibration suppression member, thereby switching said vibration suppression member to the inoperative state.

6. An apparatus according to claim 5, wherein said vibration suppression member has a recess portion at a predetermined position, and said locking member brings said rod-like member into contact with said recess portion, thereby switching said vibration suppression member to the inoperative state.

7. An apparatus according to claim 5, wherein a portion, contacting said vibration suppression member, of said rod-like member is flat.

8. An apparatus according to claim 5, wherein said locking member has a spring member, and said spring member applies a biasing force to said rod-like member in a direction substantially opposite to a direction to bring said rod-like member into contact with said vibration suppression member.

9. An apparatus according to claim 5, wherein said rod-like member is moved upon being pushed by a member integrated with said lens member in substantially said optical axis direction.

10. An apparatus according to claim 2, wherein said locking member fixes said vibration suppression member in a state wherein an optical axis of said vibration suppression member coincides with an optical axis of said lens member.

11. An apparatus according to claim 1, wherein said locking member has a permanent magnet and a coil, and said vibration suppression member is switched from said inoperative state to said operative state or vice versa by energizing said coil to generate a magnetic flux in said coil.

12. An apparatus according to claim 1, wherein said vibration suppression member is an optical member arranged in an optical path.

13. An apparatus according to claim 1, further comprising:
a vibration detection member for detecting a vibration;
a driving member for driving said vibration suppression member; and
a control circuit for controlling said driving member according to an output from said vibration detection member.

14. An apparatus according to claim 1, wherein said vibration suppression member is moved in a direction substantially perpendicular to an optical axis to perform a vibration suppression operation.

15. An apparatus according to claim 1, wherein said lens member includes a focus lens, and performs a focusing operation by moving said focus lens from the position corresponding to said photographing preparation state.

16. An apparatus according to claim 1, wherein said lens member includes a zoom lens, and performs a zooming operation by moving said zoom lens from the position corresponding to said photographing preparation state.

17. An optical apparatus having a vibration suppression function, comprising:
a lens member movable at least to positions corresponding to inactive and active preparation states;
a vibration suppression member for optically correcting a blur of image; and
a locking member for selectively switching said vibration suppression member between an operative state and an inoperative state, said locking member switching said vibration suppression member to the inoperative state in response to a movement of said lens member to the position corresponding to the inactive state.

18. An optical apparatus having a vibration suppression function, comprising:
a lens member movable at least to positions corresponding to non-photographing and photographing preparation states; a vibration suppression member for optically correcting a blur of image;
a locking member for selectively switching said vibration suppression member between an operative state and an inoperative state; and
a position detection member for detecting a position of said lens member, said locking member switching said vibration suppression member to the inoperative state in response to detection of a movement of said lens member to the position corresponding to the non-photographing state by said position detection member.

19. An apparatus according to claim 18, wherein said lens member is movable at least to the position corresponding to said non-photographing state wherein said lens member is retracted, and the position corresponding to said photographing preparation state wherein said lens member projects.

20. An apparatus according to claim 18, wherein said locking member switches said vibration suppression member from said inoperative state to said operative state according to the movement of said lens member from the position corresponding to said non-photographing state to the position corresponding to said photographing preparation state.

21. An apparatus according to claim 18, wherein said locking member has a permanent magnet and a coil, and said vibration suppression member is switched from said inoperative state to said operative state or vice versa by energizing said coil to generate a magnetic flux in said coil.

22. An apparatus according to claim 18, wherein said vibration suppression member is an optical member arranged in an optical path.

23. An apparatus according to claim 18, further comprising:
a vibration detection member for detecting a vibration;
a driving member for driving said vibration suppression member; and
a control circuit for controlling said driving member according to an output from said vibration detection member.

24. An apparatus according to claim 18, wherein said vibration suppression member is moved in a direction substantially perpendicular to an optical axis to perform a vibration suppression operation.

25. An apparatus according to claim 18, wherein said lens member includes a focus lens, and performs a focusing operation by moving said focus lens from the position corresponding to said photographing preparation state.

26. An apparatus according to claim 18, wherein said lens member includes a zoom lens, and performs a zooming operation by moving said zoom lens from the position corresponding to said photographing preparation state.

27. An optical apparatus having a vibration suppression function, comprising:
- a lens member which can change its state at least to inactive state and active preparation state;
- a vibration suppression member for deflecting a light beam for said lens member according to a vibration of said apparatus; and
- a switching member for selectively changing the operation state of said vibration suppressing member to an operative state or inoperative state, said vibration suppression member changing the operation state of said vibration suppression member in response to the changeover of the operation state of said lens member.

28. An optical apparatus according to claim 27, wherein said switching member changes said vibration suppression member to the inoperative state in response to said lens member being changed to the inactive state.

29. An optical apparatus according to claim 27, wherein said lens member changes the operation state by movement thereof.

30. An optical apparatus according to claim 27, wherein said vibration suppression member is movably supported in an optical path of the light beam for said lens member and suppresses the vibration by deflecting the light beam, and said switching member is a locking member for locking said vibration suppression member to change said vibration suppression member to the inoperative state.

31. An optical apparatus, comprising:
- a movable lens member;
- a vibration suppression member for optically suppressing a vibration;
- a changing member for selectively changing-over said vibration suppression member to operable state and to inoperable state, said changing member performing the changing-over to the operation state of said vibration suppression member in response to a movement of said lens member.

32. An optical apparatus according to claim 31 further comprising a position detection means for detecting a position of said lens member, said changing member changing the operation state of said vibration suppression member in accordance with a result of detection of said position detection means.

33. An optical apparatus according to claim 31, wherein said lens member is movable in the direction of the optical axis.

34. An optical apparatus using (i) lens means being selectively movable to a using state and a non-using state, and (ii) an image blur prevention portion for image blur prevention, said apparatus comprising:
- determining means for determining movement of the lens means to the non-using state; and
- response means for causing the image blur prevention portion to be inoperative in response to determination by said determining means of movement of the lens means to the non-using state.

35. An apparatus according to claim 34, wherein the image blur prevention portion comprises optical means for deflecting a light beam by moving in an optical path, and said response means comprises fixing means for fixing the optical means in response to determination by said determining means of movement of the lens means to the non-using state.

36. An apparatus according to claim 35, wherein said fixing means comprises locking means for mechanically locking the optical means.

37. An apparatus according to claim 36, wherein said locking means comprises moving means for moving to a position where the optical means is mechanically locked, said moving means moving in an interlocking manner with respect to the movement of the lens means to the non-using state.

38. An apparatus according to claim 35, wherein said fixing means comprises locking means for electromechanically locking the optical means.

39. An apparatus according to claim 34, wherein said response means comprises moving means for moving in an interlocking manner with respect to the movement of the lens means, and wherein said response means causes the image blur prevention portion to be inoperative by a movement of the moving means.

40. An apparatus according to claim 34, wherein the lens means moves to the using state by moving to a projected position and moves to the non-using state by moving to a retracted position.

41. An apparatus according to claim 34, wherein said apparatus further comprises the image blur prevention portion.

42. An apparatus according to claim 34, wherein said apparatus further comprises the lens means.

43. An optical apparatus using (i) lens means being selectively movable to a using state and a non-using state, and (ii) an image blur prevention portion for image blur prevention, said apparatus comprising:
- determining means for determining movement of the lens means from the non-using state to the using state; and
- response means for switching the image blur prevention portion from an inoperative state to an operative state in response to determination by said determining means of movement of the lens means from the non-using state to the using state.

44. An apparatus according to claim 43, wherein the image blur prevention portion comprises optical means for deflecting a light beam by moving in an optical path, and wherein said response means comprises:
- fixing means for fixing the optical means; and
- means for releasing a fixing by said fixing means in response to determination by said determining means of movement of the lens means from the non-using state to the using state.

45. An optical apparatus using (i) lens means being selectively movable to a using state and a non-using state, and (ii) an image blur prevention portion for image blur prevention, said apparatus comprising:
- connection means connecting to the lens means for following movement of the lens means in which the lens means moves between the using state and the non-using state; and
- translation means for moving the image blur prevention portion to an operative state and to an inoperative state, said translation means being operable in response to said connection means following the movement of the lens means.

46. An apparatus according to claim 45, wherein said translation means causes the image blur prevention portion to move to the inoperative state in response to said connection means following the movement of the lens means from the using state to the non-using state.

47. An apparatus according to claim 45, wherein said translation means switches the image blur prevention portion from the inoperative state to the operative state in response to said connection means following the movement of the lens means from the non-using state to the using state.

48. A camera using (i) lens means being selectively movable to a using state and a non-using state, and (ii) an image blur prevention portion for image blur prevention, said camera comprising:

determining means for determining movement of the lens means to the non-using state;

response means for causing the image blur prevention portion to be inoperative in response to determination by said determining means of movement of the lens means to the non-using state.

49. A camera using (i) lens means being selectively movable to a using state and a non-using state, and (ii) an image blur prevention portion for image blur prevention, said camera comprising:

determining means for determining movement of the lens means from the non-using state to the using state; and response means for switching the image blur prevention portion from an inoperative state to an operative state in response to determination by said determining means of movement of the lens means from the non-using state to the using state.

50. A camera using (i) lens means being selectively movable to a using state and a non-using state, and (ii) an image blur prevention portion for image blur prevention, said camera comprising:

connection means connecting to the lens means for following movement of the lens means in which the lens means moves between the using state and the non-using state; and translation means for moving the image blur prevention portion to an operative state and to an inoperative state, said translation means being operable in response to said connection means following the movement of the lens means.

* * * * *

UNITED STATES PATENT AND TRADEMARK OFFICE
CERTIFICATE OF CORRECTION

PATENT NO.   : 5,398,132
DATED        : March 14, 1995
INVENTOR(S)  : TADASU OTANI It is certified that error appears in the above-indentified patent and that said Letters Patent is hereby corrected as shown below:

COLUMN 4

Line 50, "10" should deleted.

COLUMN 10

Line 23, "wide" should read --wide end--.

COLUMN 18

Line 12, "states; a" should read --states; ¶ a--.

COLUMN 19

Line 40, "claim 31" should read --claim 31,--.

Signed and Sealed this

Twenty-seventh Day of June, 1995

Attest:

BRUCE LEHMAN

*Attesting Officer*            *Commissioner of Patents and Trademarks*